Dec. 14, 1948.  W. L. TANCRED  2,456,158
TRACER AND AUTOMATIC PATTERN FEED
Filed April 19, 1945  2 Sheets-Sheet 1
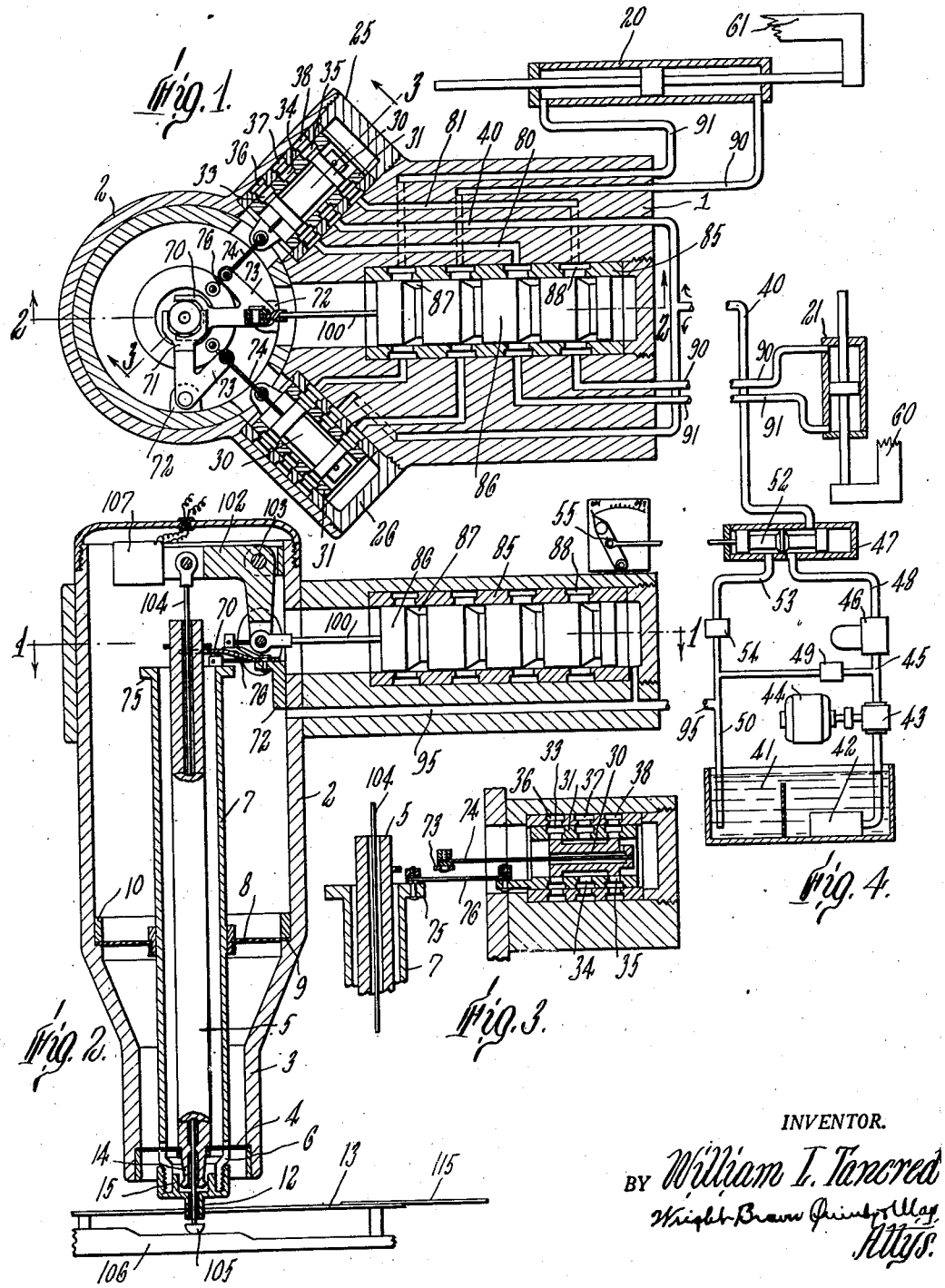
INVENTOR.
BY William L. Tancred Dec. 14, 1948. W. L. TANCRED 2,456,158
TRACER AND AUTOMATIC PATTERN FEED
Filed April 19, 1945 2 Sheets-Sheet 2
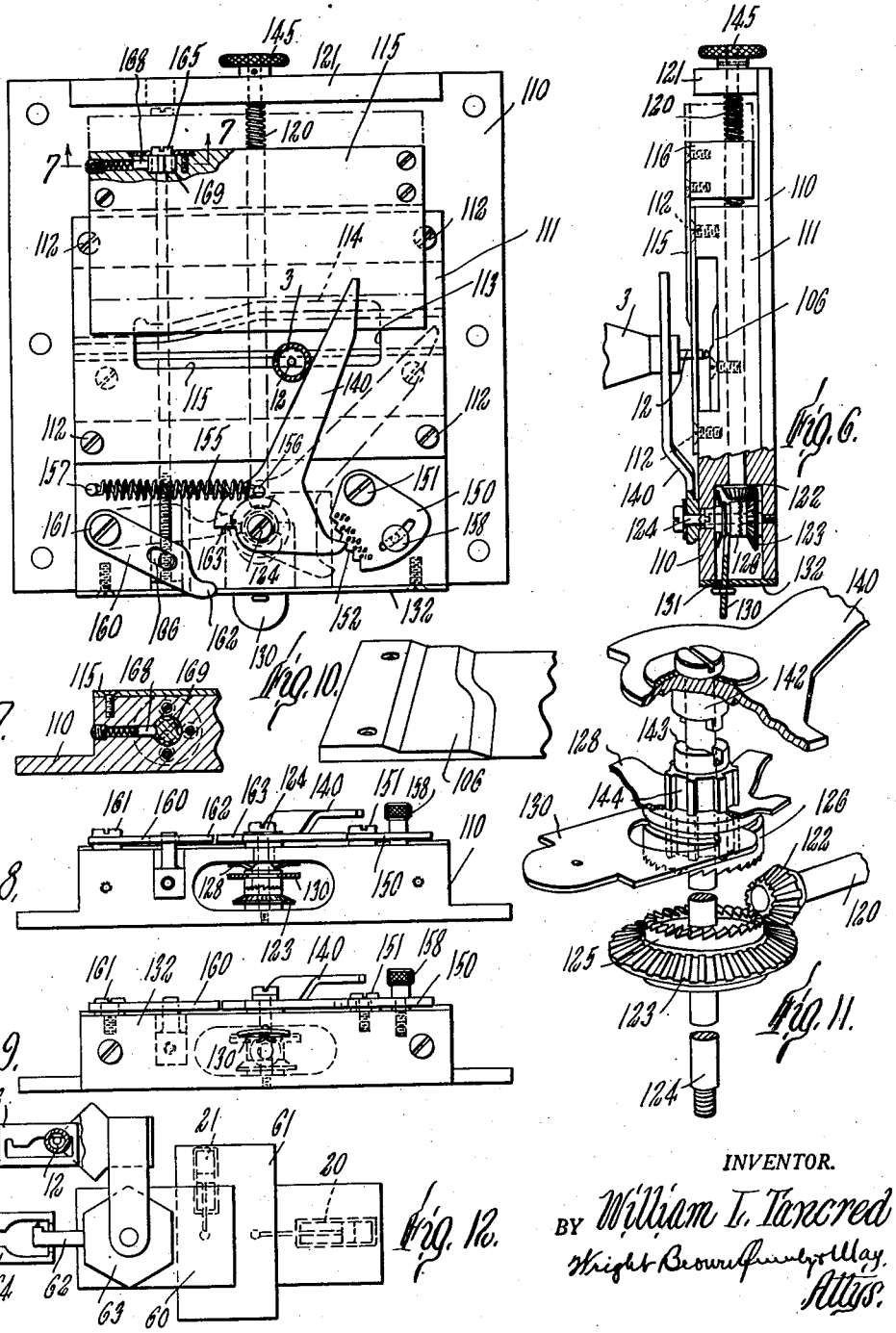
INVENTOR.
BY William L. Tancred Patented Dec. 14, 1948

2,456,158

UNITED STATES PATENT OFFICE 2,456,158

TRACER AND AUTOMATIC PATTERN FEED

William L. Tancred, Springfield, Vt., assignor to Jones & Lamson Machine Company, Springfield, Vt., a corporation of Vermont Application April 19, 1945, Serial No. 589,229

8 Claims. (Cl. 90—62)

This invention relates to tracer mechanism such as may be employed to cause a tool to operate on work to a contour determined by a pattern traced by the tracer mechanism.

One object of the present invention is to provide an automatic control of the speed of relative motion between the work and tool and between the tracer and pattern in accordance with a predetermined program. For example, such speed may be relatively high during idle or non-cutting relative motions between the tool and the work, slower where the tool may be cutting along the less complicated contours, and still slower where the contours are more intricate.

A further object of the invention is to provide for an automatic feed between a control pattern and tracer with a corresponding feed between the tool and the work for each new tracing cycle.

A still further object of the invention is to provide as a portion of the control pattern a shield for the final pattern which is progressively retracted toward an edge of the final pattern in successive tracing cycles and forms with the exposed portion of the pattern edge during any cycle, a control contour for the shape of the tool path during that cycle. By this means the tool may progressively conform to a more intricate pattern edge more and more as the contour of the work approaches the final contour desired, which is that of the final pattern, the tool cutting a straight path where it is controlled by the shield to remove a considerable amount of stock so that the cutting is uniform and as the stock becomes removed more and more, the final pattern contour takes over more and more of the control until the tool is controlled entirely by the pattern edge, at which time the shield is in position to entirely uncover the pattern edge.

For a more complete understanding of this invention, reference may be had to the accompanying drawings in which Figure 1 is a somewhat diagrammatic cross sectional view on line 1—1 of Figure 2 of a tracer mechanism embodying a portion of the invention.

Figure 2 is a longitudinal sectional view on line 2—2 of Figure 1.

Figure 3 is a detail sectional view on line 3—3 of Figure 1.

Figure 4 is a diagrammatic view of a portion of the hydraulic system.

Figure 5 is a plan view, partly broken away and in section, of the pattern support and feed mechanism, a portion of the tracer being shown in cross section.

Figure 6 is a side elevation, partly broken away and in section, of the parts shown in Figure 5.

Figure 7 is a detail sectional view on line 7—7 of Figure 5.

Figures 8 and 9 are end elevations of the mechanism shown in Figure 5, but with the end cover off and on, respectively.

Figure 10 is a fragmentary perspective view of a speed controlling cam.

Figure 11 is an exploded perspective view of a portion of the pattern feed actuating mechanism.

Figure 12 is a somewhat diagrammatic top view, a portion of the tracer being shown in section, showing the tracer mechanism and pattern control as applied to a lathe.

Referring first to Figures 1 to 4, at 1 is shown a support to which is fixed a tubular casing 2. One end of the casing 2 is shown as of reduced diameter as at 3, and near the lower extremity of this portion it is bridged across by a diaphragm 4, which forms a fulcrum means for an inner tracer element 5. The diaphragm 4 is provided with slots therethrough through which extend fingers 6 projecting from the lower end of an outer tracer element 7. This outer element 7 is provided with a fulcrum diaphragm 8 somewhat similar to the diaphragm 4 and which extends between it and the casing 2 and its outer margin may be held against an internal shoulder 9 of the casing as by a clamping ring 10.

Normally the elements 5 and 7 are concentric to each other, but they may be displaced from such relation by engagement of a feeler 12 secured to the lower end of the element 7 against the edge 13 of a controlling pattern contour edge which will later be further described. The lower end of the element 5 is formed as a head 14 which rides within and slightly spaced from a circular flange 15, which, as shown, forms a part of the feeler 12. The parts are so arranged that when the feeler 12 is displaced laterally, as by engagement against the pattern edge 13, its first motion is a pivotal motion about the diaphragm 8 as a fulcrum until the flange 15 contacts with the head 14. Thereupon further lateral motion of the feeler moves the lower end of the element 5 with it, but as this element 5 is pivoted at the diaphragm 4 much closer to its lower end than is the element 7, the upper end of the element 5 is moved in the same direction as the upper end of the element 7 but with a greatly increased amplitude. The result is that the first movement of the tracer element 7 unaccompanied by any motion of the element 5 produces a relative motion of the upper ends of the elements 5 and 7 in one direction while a further movement of the feeler after contact is made with the element 5 moves the element 5 at a much faster rate than the element 7 so that the upper ends of these elements move in a relative direction opposite to that before contact between the feeler and the element 5 was made. These relative motions between the upper ends of the elements 5 and 7 are taken advantage of to control longitudinal and transverse feeding motors which move the tracer relative to the pattern. For example, in Figure 1, a hydraulic longitudinal motor is shown at 20 and in Figure 4, a cross slide motor is shown at 21.

For the purpose of controlling the motors by this relative lateral motion of the upper end portions of the tracer elements 5 and 7, a pair of valve mechanisms 25 and 26 are illustrated. Each of these valve mechanisms comprises a spool valve 30 and each of the spool valves rides within an axially movable sleeve 31. Each sleeve has ports 33, 34 and 35 which more or less overlap valve casing passages 36, 37 and 38, respectively. The central casing passage 37 is connected to a pressure passage and pipe 40, which is supplied with fluid under pressure from a means shown somewhat diagrammatically in Figure 4. Referring to this Figure 4, fluid is taken from a supply tank 41 through a filter 42 by a pressure pump 43 operated by an electric motor 44. The pump 43 delivers into a pipe 45 to an accumulator 46 from which delivery is made to a main controlling valve 47 through the pressure pipe 48. A pressure relief valve 49 connects from the pipe 45 back to a discharge pipe 50 which thus provides for relief of any excess pressure beyond that desired in the pressure pipe 48. The valve casing 47 has a valve 52 therein, which in the position of adjustment shown, permits the passage of fluid under pressure from the pipe 48 into the pipe 40 leading to the tracer mechanism. By moving the valve 52 to the right, it will be evident that the pipe 40 may be cut off from its source of pressure, and the fluid allowed to circulate back through the pipe 53 and a low pressure relief valve 54 to the discharge 50 whenever it is desired to cut out the tracer from operation. This is operated by a control lever 55.

The tracer mechanism, including the casing 1, is carried by a carriage 60, which as shown diagrammatically in Figure 12, may be the cross slide of a lathe, this cross slide being mounted on a longitudinal slide 61. The cross slide is adapted to carry a tool 62, as in a turret 63, for operating on work 64 carried by a rotary chuck 65. The motor cylinder 20 is arranged to move the longitudinal slide, and the motor 21 is arranged to move the cross slide.

The central tracer element 5 is arranged to control the positions of the valves 30, and to this end, a pair of yokes 70 and 71 are arranged to straddle the upper portion of the tracer element 5. Each of these yokes is pivoted as on one of a pair of ears 72 to the inner face of the casing 2 and each has an arm 73 which is connected through a flexible link 74 with one of the valves 30. The upper end of the tracer element 7 is formed as a circular flange 75 and this is connected at two points through the flexible links 76 with the sleeves 31. The ports 33, 34 and 35 of each of the sleeves always overlap the corresponding passages 36, 37 and 38 of the valve casings, but through motion of these sleeves the effective positions of these ports with relation to the valves 30 is varied so that the controlling effects of each of the valves is a composite of the relative motions between the upper ends of the elements 5 and 7 and control the passage of fluid pressure from the passage 40 into passages 80 and 81. These passages 80 and 81 lead to ports in a valve casing 85 within which is slidably mounted a piston valve 86. This valve 86 is provided with annular passages 87, tapered on one side, so that they act to more or less throttle the passage of fluid, depending upon the degree of overlap between these passages 87 and the ports 88 of the casing. From the valve casing 85 extend the pressure passages 90 and 91 to opposite ends of the pressure cylinders 20 and 21.

The discharge takes place from opposite ends of the valve casing 85 through the passage 95 back to the discharge pipe 50. The position of the valve 86 which acts as just described to more or less throttle the supply of pressure to the cylinders 20 and 21, therefore acts to determine the speed of travel of the carriages 60 and 61. In accordance with this invention this speed may be regulated in accordance with a predetermined pattern. For this purpose, the valve 86 has a valve stem 100 connected to the lower end of a bell crank lever 102, fulcrumed at 103 in the upper portion of the tubular casing 2 and the upper arm 103 of this bell crank lever has pivoted thereto a rod 104 which extends down axially through the element 5 and through the feeler 12 where it is provided with a cam follower head 105 which bears on the upper face of a cam 106. This cam may have portions of different elevations thereon as shown best in Figures 2 and 10, and as the feeler is caused to trace the edge of the pattern, this follower 105 rides along the cam 106 and as it changes elevation, it causes the follower 105 to raise or lower, thus changing the axial position of the throttle valve 86 for controlling the speed of motion of the carriages 60 and 61 and the consequent speed of motion of the tracer about the pattern. An electric vibrator of any suitable type at 107 and carried by the bell crank arm 103 serves to keep the mechanism sensitive to changing forces since it prevents the various connections from any static friction conditions.

With the arrangement of valves and motors shown, a continuous travel of the tracer about a closed contour pattern may be effected without attention on the part of the operator, the tracer following around the contour automatically in one direction repeatedly. The reason for this need not be further described here, as it forms the subject matter of my application for Tracer mechanism, Serial No. 584,003, filed March 21, 1945. The means for controlling the speed of traverse is, however, subject matter of the present application.

Further subject matter of this application comprises the arrangement of the pattern and its feed relative to the tracer in such a manner that the tool, as it operates on the work, feeds deeper into the work on each tracing action until it reaches the required depth. Further, in order that the tool may operate to best advantage, it is arranged so that it does not cut the full contour of the pattern in the earlier traverses, but makes a straight cut, until stock is removed approaching the full depth which it is desired to control by the contour of the pattern. For this purpose the control contour edge initially is formed by a portion of the pattern and a portion of the straight edge of a guard plate partly overlapping the pattern. As the cutting proceeds, this guard plate is retracted by definite increments at the end of each complete traverse of the controlling contour, more or less uncovering additional portions of the actual pattern at each cycle until the entire contour is controlled by the pattern itself at which time the shield is entirely retracted. The controlling contour of the shield is straight so that a simple continuous depth of cut of the work where the shield is in controlling position is produced at each actuation. This mechanism is shown in Figures 5 to 11. At 110 is shown a support for the pattern and to which the pattern 111 may be removably secured as by the screws 112. As shown this pattern has a pattern opening 113 therethrough having a pattern edge 114 which it is desired to reproduce in the work. This opening 113 forms a continuous controlling edge for the tracer. The side 115 is the idle side of the pattern and is merely used to control the idle withdrawal motion of the tool, the active and controlling edge 114 of the pattern being duplicated on all sides of the rotational axis where the work is rotating as when carried by a rotary chuck as is shown in Figure 12. As shown, for example, the work is intended to be a bottle mold having a round internal surface of a contour determined by the edge 114 of the pattern opening. This pattern opening may be more or less covered by the shield 115, which is removably secured to a block 116 mounted for motion on the support 110 perpendicular to the edge 115 of the pattern opening. It is arranged to be fed so as to be withdrawn by definite increments from overlying relation to the edge 114 of the pattern, and for this purpose it is shown as having threaded engagement with a feed rod 120 journaled in a frame portion 121 at one end and extending through a portion of the support 110 at the other, as shown in Figure 6. This feed rod 120 is provided at one end with a beveled pinion 122 which meshes with a bevel gear 123 on a shaft 124. The bevel gear 123 has a crown ratchet gear portion 125 with which may mesh a similar crown ratchet gear 126 axially movable on the shaft 124 and normally held pressed into engagement with the crown gear 125 as by a plate spider spring 128. It may, however, be removed from contact with the crown gear 125 by exerting pressure on the outer end of a release lever 130 projecting through a slot 131 in an end plate 132 of the support 110. On one face of the support 110 a lever 140 is journaled on the shaft 124, and secured to this lever 140 is a clutch element 142 adapted to engage a mating clutch element 143 at the upper end of a splined collar 144 on which the plate spring 128 is slidable. Rocking of the lever 140 imparts rotation to the clutch portions 142 and 143 and rotates the ratchet gear 126.

When this gear 126 is being rotated in a clockwise direction, as shown in Figure 11, the crown gear 125 is driven, which drives the beveled gears 123 and 122 and steps the shaft 120 around in a direction to withdraw the shield 115 from overlapping relation to the pattern. Rocking of the lever 140 in the opposite direction, permits the teeth of the ratchet gear 126 to ride up against the action of the plate spring 128, slipping over the teeth of the crown ratchet gear 125 so that no reverse rotation of the feed rod 120 is produced, but at any desired time the operator may press on the outer end of the lever 130, withdrawing the ratchet gear 126 from engagement with the crown ratchet gear 125 to permit rotation of the feed rod 120 in either direction desired by turning the hand wheel 145 secured to its end. By this means the shield may be re-set (relative to the pattern) for a new complete cycle of operations.

As shown best in Figure 5, the lever 140 extends over the pattern opening 113 in position to be engaged by the portion 3 of the tracer at each tracing cycle of the pattern, thus to rock the lever 140 by contact therewith away from a starting position. The location of this starting position is regulated by the angular adjustment of a segment 150 fulcrumed at 151 on the support 110 and having a series of notches 152 in one edge which may be brought selectively into position to limit the return motion of the arm 140 as produced by a spring 155 secured to a pin 156 carried by the lever 140 at one end and to a fixed pin 157 at the other. The segment 150 may be secured in an adjusted position by a thumb screw 158. The tracer in its motion about the pattern at each tracing action thus swings the lever from a starting full line position shown in Figure 5 to the dotted line position, and produces a retracting motion of the shield, depending in magnitude upon the position of the segment 150 which determines the initial position of the lever 140 from which each swinging motion of the lever is started. Thus in the position shown in Figure 5, the controlling contour for the tracer is formed partly by the contour of the opening 113 of the pattern and partly by the straight edge of the shield which overlaps the pattern edge. As the shield is retracted step by step, more and more of the contour of the pattern becomes effective to determine the path of motion of the tracer until finally the entire contour traced by the tracer is that of the pattern.

Means is shown for stopping retracting motion of the shield 115 after it has fully uncovered the pattern. This comprises the arm 160 pivoted at 161 and having an end 162 adapted to engage a shoulder 163 on the lever 140 and rock the lever 140 to its inactive dotted line position. This arm 160 is moved into this position by pull exerted thereon by the screw rod 165 having a nut thereon extending into the slot 166 of the arm 160. This rod 165 is secured in the block 116 which carries the shield 115, but is angularly adjustable to adjustably locate the nut 166, in accordance with the requirements of the particular pattern used. A spring pressed plug 168 engaging a recessed shoulder 169 of the rod 165 releasably holds the rod in the desired angular position. When the full pattern contour has been cleared by the shield, the pattern contour will be retraced until the machine is stopped.

Since the proportion of the contour traced by the pattern may vary in accordance with the position of the shield, the contour of the speed controlling pattern may also vary across its width as shown in Figure 10, so that as the contour control becomes more intricate as more and more of the pattern edge comes into controlling position, the speed control of the pattern may be correspondingly varied. This is shown, for example, in Figure 10, wherein the slow feed lowest porton of the speed control plate is more extensive toward the rear portion of the pattern than toward the forward portion where less of the pattern edge controls the contour traced.

From the foregoing description of an embodiment of this invention it should be evident to those skilled in the art that various changes and modifications might be made without departing from its spirit or scope.

I claim:

1. In combination, a tracer mechanism comprising a support, a pair of elements one within the other, and each pivoted to said support, a feeler carried by one of said elements, said feeler-carrying element being pivoted to said support closer to said feeler than the pivot of the other of said elements, a pattern having an edge with which a side of said feeler may contact, means for moving said support and pattern relatively under control of said feeler as it is moved relative to said support and to said other element by contact of said pattern against said feeler, a cam associated with said pattern, a follower member carried by said support and extending through said feeler transverse to said feeler side and engaging and moving along said cam as said support and pattern are moved relatively, and means actuated by motion of said follower produced by said cam as said support and pattern are moved relatively for controlling the speed of said moving means.

2. In combination, a pattern presenting a continuous contour edge, a support, a tracer carried by said support and having a feeler movable relative to said support for contact with said edge, power means controlled by changing relation between said support and feeler for relatively moving said tracer and pattern to cause said feeler to trace said edge continuously, and means actuated by such relative motion on each completion of a tracing cycle to move at least a portion of said edge relative to said feeler by a predetermined increment.

3. In combination, a pattern presenting a contour edge, a shield adapted to lap a portion of said shield relative to said pattern to vary the form with a part of said pattern edge a portion of a continuous contour edge, means for moving said shield relative to said pattern to vary the proportion of its edge and said pattern edge effective to form said continuous contour, a tracer, means for moving said tracer continuously and automatically around the effective contour edge of said pattern and shield, and means automatically actuated by said tracer as it is moved in a predetermined portion of its path for actuating said shield-moving means to move said shield outwardly by increments each of a predetermined amount until the effective contour is produced entirely by the contour of said pattern.

4. In combination, a pattern having a continuous edge, a shield lapping said pattern and having an edge which may with a portion of said pattern edge determine a continuous controlling contour, said shield being mounted for motion across said pattern, a tracer, means for moving said tracer in contact with said controlling contour in continuous and repeated circuits, a movable member normally projecting adjacent to said continuous contour to be engaged and moved by said tracer each time said tracer reaches a predetermined point in said circuit, and means actuated by the movement of said member to move said shield outwardly by successive increments to thereby cause increasing lengths of pattern contour to be uncovered by said shield and become effective to determine the contour path described by said tracer.

5. In combination, a pattern having a continuous edge, a shield lapping said pattern and having an edge which may with a portion of said pattern edge determine a continuous controlling contour, said shield being mounted for motion across said pattern, a tracer, means for moving said tracer in contact with said controlling contour in continuous and repeated circuits, a movable member normally projecting adjacent to said continuous contour to be engaged and moved by said tracer each time said tracer reaches a predetermined point in said circuit, means actuated by the movement of said member to move said shield outwardly by successive increments to thereby cause increasing lengths of pattern contour to be uncovered by said shield and become effective to determine the contour path described by said tracer, and means adjustably determining the starting position of said member in which it is engaged by said tracer to thereby determine the extent of such increments.

6. In combination, a pattern having a continuous edge, a shield lapping said pattern and having an edge which may with a portion of said pattern edge determine a continuous controlling contour, said shield being mounted for motion across said pattern, a tracer, means for moving said tracer in contact with said controlling contour in continuous and repeated circuits, a movable member normally projecting adjacent to said continuous contour to be engaged and moved by said tracer each time said tracer reaches a predetermined point in said circuit, means actuated by the movement of said member to move said shield outwardly by successive increments to thereby cause increasing lengths of pattern contour to be uncovered by said shield and become effective to determine the contour path described by said tracer, means adjustably determining the starting position of said member in which it is engaged by said tracer to thereby determine the extent of such increments, means for returnng said member to starting position after each actuation thereof, and one-way clutch means for causing motion of said member in one direction only to move said shield.

7. In combination, a pattern having a continuous edge, a shield lapping said pattern and having an edge which may with a portion of said pattern edge determine a continuous controlling contour, said shield being mounted for motion across said pattern, a tracer, means for moving said tracer in contact with said controlling contour in continuous and repeated circuits, a movable member normally projecting adjacent to said continuous contour to be engaged and moved by said tracer each time said tracer reaches a predetermined point in said circuit, means actuated by the movement of said member to move said shield outwardly by successive increments to thereby cause increasing lengths of pattern contour to be uncovered by said shield and become effective to determine the contour path described by said tracer, means adjustably determining the starting position of said member in which it is engaged by said tracer to thereby determine the extent of such increments, means for returning said member to starting position after each actuation thereof, one-way clutch means for causing motion of said member in one direction only to move said shield, means actuable to release said one-way clutch means, and means actuable when said clutch means is released to return said shield inwardly to a position of greater obstruction of said pattern contour.

8. In combination, a pattern presenting a contour edge, a shield adapted to lap a portion of said pattern and presenting an edge adapted to form with a part of said pattern edge a portion of a continuous contour edge, means for moving said shield relative to said pattern to vary the proportion of its edge and said pattern edge effective to form said continuous contour, a tracer, means for moving said tracer continuously around the effective contour edge of said pattern and shield, means automatically actuated when said tracer is in a predetermined position in its path for actuating said shield-moving means to move said shield outwardly by increments each of a predetermined amount until the effective contour is produced entirely by the contour of said pattern, and means effective when the effective contour is produced entirely by the contour of said pattern to render inoperative said actuating means.

WILLIAM L. TANCRED.

REFERENCES CITED

The following references are of record in the file of this patent:

UNITED STATES PATENTS

| Number | Name | Date |
|---|---|---|
| 1,798,926 | Black | Mar. 31, 1931 |
| 2,116,593 | Bouvier | May 10, 1938 |
| 2,332,532 | Roehm | Oct. 26, 1943 |
| 2,372,427 | Johnson | Mar. 27, 1945 |